US006593928B1

(12) United States Patent
Chang et al.

(10) Patent No.: US 6,593,928 B1
(45) Date of Patent: Jul. 15, 2003

(54) AUTO SCREEN CENTERING AND EXPANSION OF VGA DISPLAY MODES ON LARGER SIZE OF LCD DISPLAY DEVICE

(75) Inventors: Richard Chang, Cupertino, CA (US); Raymond Wong, Danville, CA (US); Terry Chang, Sunnyvale, CA (US)

(73) Assignee: Silicon Motion, Inc., San Jose, CA (US)

( * ) Notice: Subject to any disclaimer, the term of this patent is extended or adjusted under 35 U.S.C. 154(b) by 0 days.

(21) Appl. No.: 09/505,350

(22) Filed: Feb. 16, 2000

(51) Int. Cl.[7] ............................ G06F 15/00; G06T 1/00
(52) U.S. Cl. ........................................ 345/501; 345/643
(58) Field of Search ................................ 345/501, 530, 345/561, 629, 643, 698, 418

(56) References Cited

U.S. PATENT DOCUMENTS 4,574,279 A 3/1986 Roberts
6,377,265 B1 * 4/2002 Bong ......................... 345/561

* cited by examiner

*Primary Examiner*—Kee M. Tung
(74) *Attorney, Agent, or Firm*—Blakely, Sokoloff, Taylor & Zafman LLP

(57) ABSTRACT

The invention in one embodiment is an apparatus. The apparatus includes a lookup table having a set of entries, each entry capable of maintaining a value. The apparatus also includes a DDA (Differential Digital Analyzer) table having a set of entries, each entry capable of maintaining a value and each entry of the DDA table corresponding to an entry of the lookup table. The apparatus further includes a first multiplexing unit having a set of inputs, each input corresponding to and coupled to an entry of the DDA table. The first multiplexing unit also having a control input, the control input causing the first multiplexing unit to route one of the inputs of the set of inputs to an output. Additionally, the apparatus includes a comparison block having logic suitable for comparing each entry of the lookup table to a comparison value. Furthermore, the apparatus include a select control block having logic suitable for generating a control signal based on an output of the comparison block, the output of the comparison block indicating which entry of the lookup table matched the comparison value. The control signal is generated on an output of the select control block, and the output of the select control block is coupled to the control input of the first multiplexing unit.

16 Claims, 8 Drawing Sheets

AUTO SCREEN CENTERING AND EXPANSION OF VGA DISPLAY MODES ON LARGER SIZE OF LCD DISPLAY DEVICE

BACKGROUND OF THE INVENTION

1. Field of the Invention

This invention relates generally to the field of video and graphics control and more specifically to automatically processing graphics data in old graphics formats for display on devices utilizing newer graphics formats.

2. Description of the Related Art

Computer systems have been implemented for years as desktop systems utilizing monitors. These monitors typically are capable of displaying a number of different resolutions, a resolution being a certain number of pixels which may be displayed on a screen. Resolutions are typically specified as a width by a height such as the IBM VGA standard of 640 pixels by 480 pixels (640×480). On a classic CRT or cathode ray tube monitor a 640×480 pixel resolution would eventually be translated into an image that could be displayed by the cathode ray guns of the monitor. Other resolutions commonly found are 640 by 400 pixels (640×400), 640 by 200 pixels (640×200) and 640 by 350 pixels (640×350). Since all of these resolutions have existed for years, much software has been written which is designed to work with one or more of these resolutions and typically a computer system would be capable of using more than one mode or more than one resolution. The display mode or resolution would be something that could be switched either by software or by hardware. If the display mode was switchable by software it might be switchable dynamically by a program or it might be switchable between execution of various different programs on the computer system or between execution of various different programs by an operating system running on the computer system.

Since these resolutions were often dynamically switchable a program might start out running in a text mode or low resolution mode, such as 640×200, suitable for displaying large fonts and then switch at some point to a graphics or high resolution mode, such as the 640×400 mode, which would be more suitable for displaying graphics images. Graphics images are often made up of numerous individual pixels which may be turned off or on from one moment to the next. Note that in the low resolution mode such as a text mode all of the pixels can be turned off or on from one moment to the next. However, the pixels are typically relatively constant because predetermined patterns are used for displaying the characters in text mode.

With the advent of the liquid crystal display a new type of monitor or display was available. Furthermore, liquid crystal displays are capable of higher resolution than the 640×480 IBM VGA standard for example. One common resolution of a liquid crystal display is 1024 by 768 pixels, that is 1024 pixels wide by 768 pixels high (1024×768). Liquid crystal displays, unlike cathode ray tubes, do not operate with cathode ray guns. A cathode ray gun will excite a multitude of phosphors which will cause an image to appear on the cathode ray tube, and often multiple phosphors make up a single pixel.

A liquid crystal display has a small cell for each pixel which may be displayed or may have multiple cells depending on whether the liquid crystal display is a color or a black and white system for example, but there is a one to one correspondence between the liquid crystal cells of the liquid crystal display and the pixels that may be displayed by the liquid crystal display. As a result when one wishes to run a program written for the IBM VGA standard 640×480 or for a number of different resolutions such as 640×400 and 640×200, these must be scaled or centered or both scaled and centered to be displayed on the liquid crystal display. However scaling and centering these images that are generated by these programs in order to display them on the liquid crystal display is not necessarily a completely straightforward process.

Turning to FIG. 1, a prior art graphics processing apparatus 100 is illustrated. A vertical display height register 110 is contained within the graphics processing apparatus 100 and into it may be written or may be preprogrammed the display height that a software program is using. Also a DDA (Differential Digital Analyzer) value register 120 is contained within the graphics processing apparatus and to that register may be written a DDA value which would be a 10 bit value suitable for use by a vertical expansion DDA engine 140. The vertical expansion DDA engine performs the process of expanding an image such as a 640×480 image on to a larger screen size, for instance a 640×480 image may be expanded to a 960×720 image. Also in graphics processing apparatus 100 is a vertical centering register 130 containing a value suitable for use by a vertical centering control logic block 150. The vertical centering control logic block 150 may be used to offset an image generated by a software program from the edge of the liquid crystal display in the vertical direction. In the prior art configuration each of these registers must be reprogrammed each time the software changes the resolution that it is using.

IBM VGA is an industrial standard. All applications programs written for the IBM VGA standard may directly change any published IBM VGA registers without going through the operating system software (such as MSDOS, MS Windows, etc.). For example, the vertical parameter (height in the resolution) is most likely to be changed as most of the resolutions all use the 640 pixel width but vary the number of pixels that may be used for the height of the image any time the mode is changed. Therefore, it is very likely that the vertical parameters embodied in vertical display height register 110, DDA value register 120 and vertical centering register 130 must be altered. Unfortunately programming by software developers is often unorthodox. The need to speed up code or save memory caused programmers to choose shortcuts which result in an operating system or an underlying computer system not being alerted that the software is planning to change modes or has changed display modes. In particular, it is not uncommon for a video game program to switch from a text mode to a graphics mode by resorting to a short cut which skips any intervening layers between the program and the underlying computer systems such as the operating system. In so doing the program may save time and memory on an older computer system but fail to alert a newer computer system such as one managing a liquid crystal display to the fact that it is changing resolutions. Likewise it is not uncommon for programs to automatically initialize the resolution to whatever resolution the program will run without necessarily alerting the operating system through use of standard procedure or function calls which the operating system or graphics driver provides to properly set the resolution of the display.

Therefore, it would be advantageous to include within graphics controllers a method for fitting an image (either text or graphics) which may vary in resolution from application to application into a LCD display with a fixed resolution such as 1024×768 for example.

SUMMARY OF THE INVENTION

The invention in one embodiment is an apparatus. The apparatus includes a lookup table having a set of entries, each entry capable of maintaining a value. The apparatus also includes a DDA (Differential Digital Analyzer) table having a set of entries, each entry capable of maintaining a value and each entry of the DDA table corresponding to an entry of the lookup table. The apparatus further includes a first multiplexing unit having a set of inputs, each input corresponding to and coupled to an entry of the DDA table. The first multiplexing unit also having a control input, the control input causing the first multiplexing unit to route one of the inputs of the set of inputs to an output. Additionally, the apparatus includes a comparison block having logic suitable for comparing each entry of the lookup table to a comparison value. Furthermore, the apparatus include a select control block having logic suitable for generating a control signal based on an output of the comparison block, the output of the comparison block indicating which entry of the lookup table matched the comparison value. The control signal is generated on an output of the select control block, and the output of the select control block is coupled to the control input of the first multiplexing unit. The apparatus may be implemented in a display controller or a graphics controller for example.

BRIEF DESCRIPTION OF THE DRAWINGS

The present invention is illustrated by way of example and not limitation in the accompanying figures.

DETAILED DESCRIPTION

A method and apparatus for auto screen centering and expansion of vga display modes on larger size of lcd display device is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are embodiments mutually exclusive.

Figure 1:
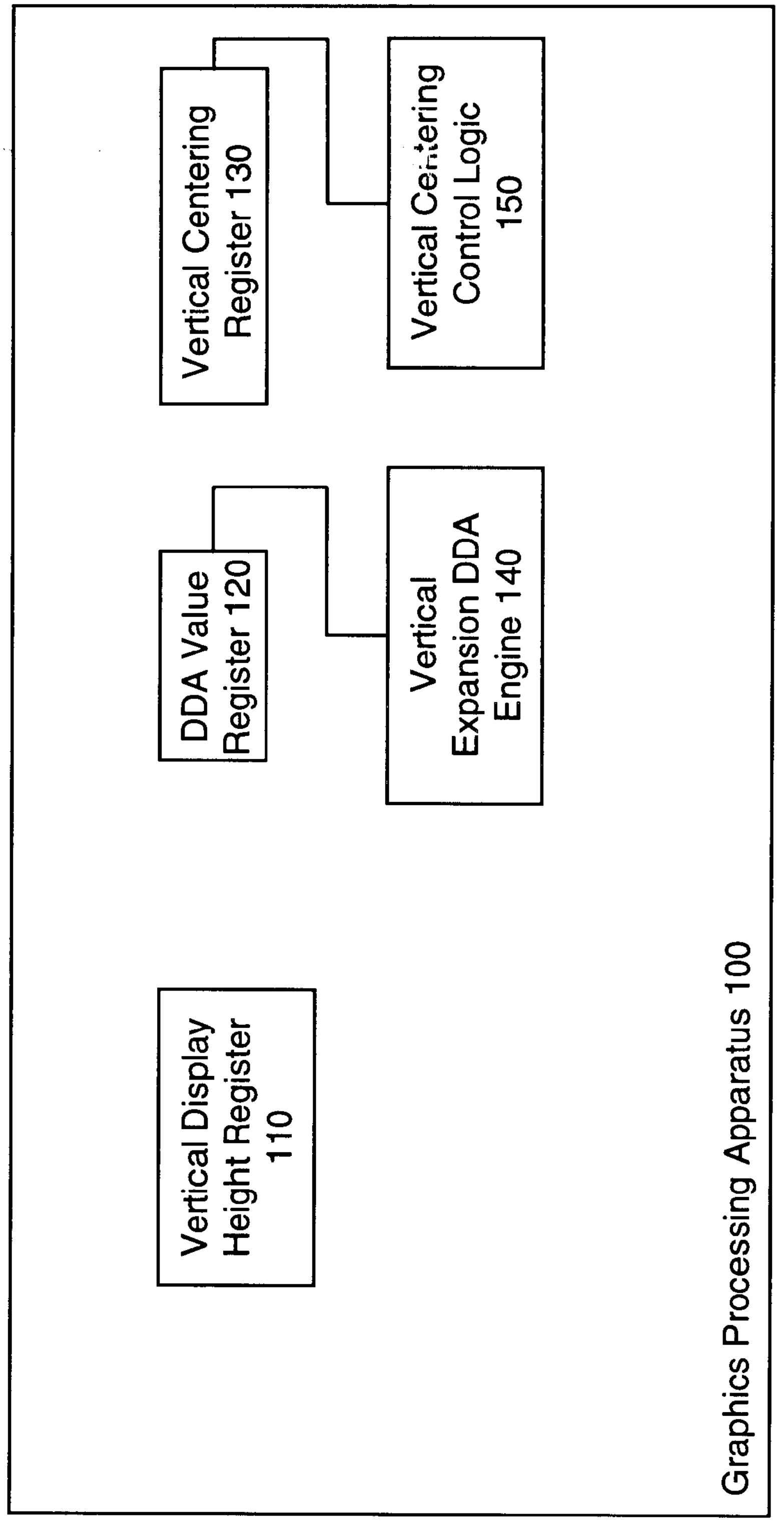
Fig. 1 (Prior Art)
FIG. 1 illustrates a prior art graphics processing apparatus.
Figure 2:
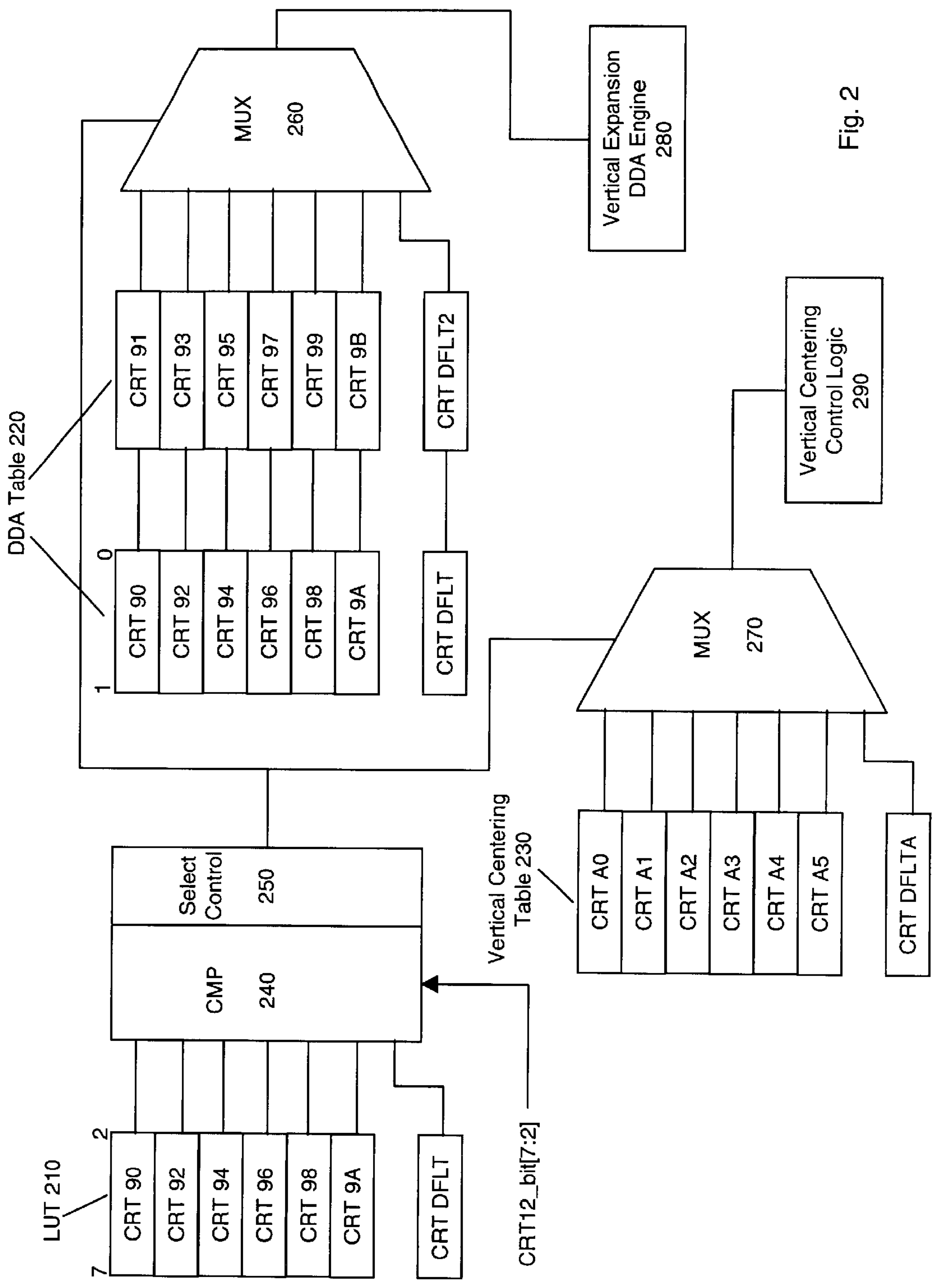
FIG. 2 illustrates an embodiment of a graphics processing apparatus.

Turning to FIG. 2, one embodiment of an apparatus for automatically centering and expanding an image to be displayed on a liquid crystal display is illustrated. LUT 210, or lookup table 210 consists of bits 7 through 2 of seven different registers, those registers being CRT 90, CRT 92, CRT 94, CRT 96, CRT 98, CRT 9A and CRT DEFAULT. Each of these registers is coupled to compare logic or comparison block CMP 240. Also coupled to compare logic 240 is a six bit line leading from a register CRT 12. This six-bit line leads from bits 7 through 2 of register CRT 12. Within compare logic 240 the value of CRT 12 in bits 7 through 2 is compared with the value of each of the registers in lookup table 210. If a match to any of the registers is found then that match results in a certain control signal being selected in select control block 250. If no match is found then the default control signal is selected in select control 250. It will be appreciated that select control 250 is coupled to or may be integrated with compare logic 240.

DDA (Differential Digital Analyzer) table 220 consists of two tables of registers. The first portion of the table includes bits 1 through 0 of registers CRT 90, CRT 92, CRT 94, CRT 96, CRT 98, CRT 9A and CRT DEFAULT. The second portion of the table consists of registers CRT 91, CRT 93, CRT 95, CRT 97, CRT 99, CRT 9B and CRT DEFAULT register 2. Each entry of each of these two portions of the table is coupled to MUX 260, a multiplexer circuit or multiplexing unit. The control signal from select control 250 is routed to multiplexer 260. That select control signal causes multiplexer 260 to route one of the values from DDA table 220 through to vertical expansion DDA engine 280.

Similarly, vertical centering table 230 consists of seven registers CRT A0, CRT A1, CRT A2, CRT A3, CRT A4, CRT A5 and CRT DEFAULT register A.

Each of the registers in vertical centering table 230 is coupled to multiplexing circuit 270 or MUX 270. Also coupled to MUX 270 is a signal from select control 250. The signal from select control 250 coupled to MUX 270 causes MUX 270 to route the value of one of the seven registers of vertical centering table 230 through the output of MUX 270 to vertical centering control logic 290.

Each of the values in each of the registers in lookup table 210, DDA table 220 and vertical centering table 230 is programmable. As a result a six bit value may be programmed in each register in lookup table 210. Then the six bit value may be programmed in the CRT 12, a register which is used to hold the current information about what display mode is being utilized. Compare logic 240 then compares that information or that value with each of the values in lookup table 210. Each of those values preferably corresponds to one mode of operating a graphics system. Likewise, each of the values in DDA table 220 preferably is the 10 bit value which should be routed to DDA expansion 280 to properly vertically expand the pixels in the current operating mode or current display mode that the program is using. Furthermore each of the values of the vertical centering table 230 preferably corresponds to the number of pixels by which an image should be shifted down from the top of the screen and that value is then routed to vertical centering control logic 290. In one embodiment the vertical centering table 230 contains six bit register values. Each register may be multiplied by 4 to find the number of pixels by which an image should be shifted down the screen from the top of the liquid crystal display.

Thus, if the value in register CRT 12 matches the value in register CRT 90 for bits 7 through 2 of both registers, then the value of bits 1 through 0 of CRT 90 and the value of register CRT 91 is concatenated to form a 10 bit value which is routed to the vertical expansion DDA engine 280. Likewise the value of CRT A0 is routed to vertical centering control logic 290. A similar correspondence may be found between CRT 92 and the rest of CRT 92 and CRT 93 and CRT A1. A similar correspondence may be found throughout the tables illustrated in FIG. 2.

The value in the register CRT 12 is preferably adjusted by a software program which is part of the BIOS or built in operating system of the graphics system which incorporates the invention. This value is changed in response to monitoring by the program of the graphics BIOS of data flowing to the graphics subsystem for display on a monitor (LCD or CRT for example) or other graphics display devices. When it is apparent that that data has changed resolution or changed display modes, the value of CRT 12 is adjusted to reflect this so that the graphics processing system may properly process the information being fed to it by the underlying computer system.

Likewise it will be appreciated that the values in the CRT default registers CRT DEFAULT, CRT DEFAULT register 2 and CRT DEFAULT A will be used by the graphics processing system when none of the values in the other six registers of lookup table 210 are matched by the value in register CRT 12. This may occur for example if the BIOS has been altered or corrupted or if the graphics subsystem incorporating the invention is designed such that the value in CRT 12 is modifiable by something other than the graphics BIOS. If the value in CRT 12 is modifiable by, for instance, the operating system or an underlying program running on the computer system then the value in CRT 12 may not be wholly predictable. Additionally, the values in lookup table 210, DDA table 220 and vertical centering table 230 are all preferably programmable such that the operating system or the BIOS may initialize those values for a set of default graphics modes and their corresponding parameters in the DDA table 220 and vertical centering table 230. Those values may later be modified if it becomes apparent that a different graphics mode or display mode from those that are currently programmed within the three tables is necessary for proper operation of the system.

It will be appreciated that the blocks of FIG. 2 may be implemented in a variety of ways. For example, a multiplexing unit (or selector) may be any circuitry which may be used to select one value from a variety of values based on a control input. A value provider may be a multiplexing unit or other circuitry which provides a value at an output, preferably determined by one or more inputs, such as control and data inputs. Likewise, a comparison block may be any circuitry which may be used to compare a first value to a second value or a set of values. Furthermore, a select control block may be any circuitry which may use the results of comparisons performed by a comparison block to generate a control signal, such as a signal suitable for use by a multiplexing unit as a control input. Additionally, the tables may be composed of sets of memory locations, which may be registers or other memory and may be organized in a variety of different ways.

Figure 3:
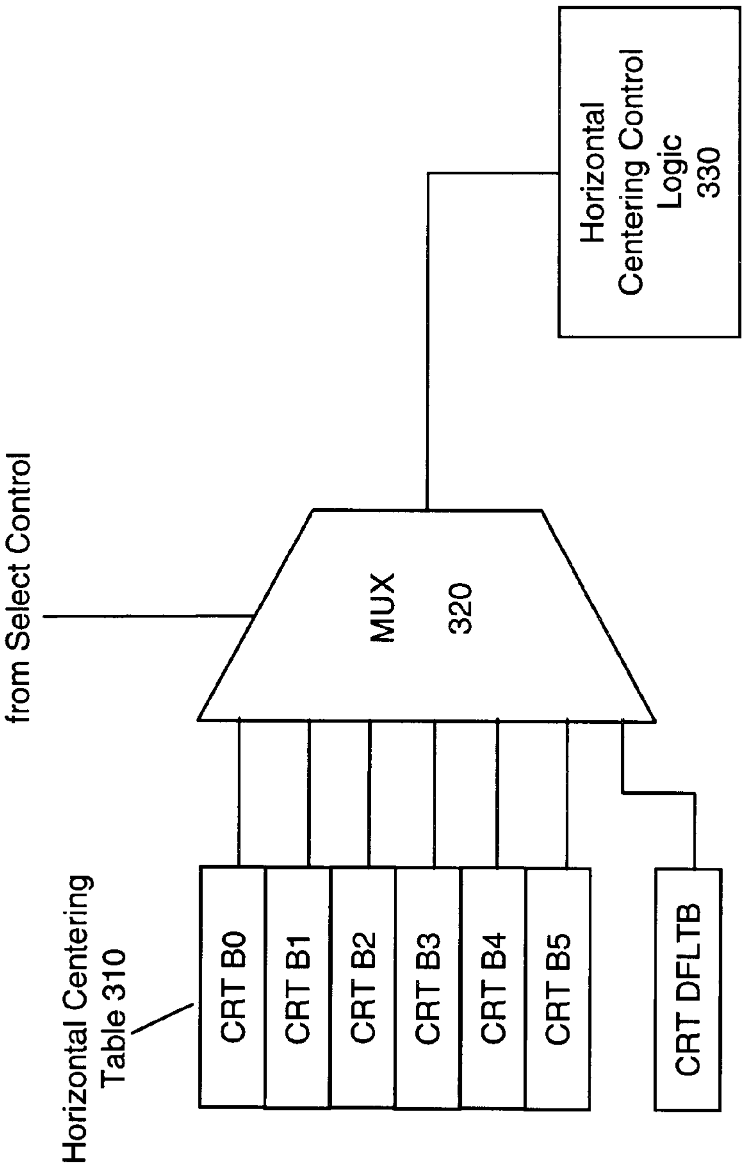
FIG. 3 illustrates a further portion of an embodiment of a graphics processing apparatus.

Turning to FIG. 3, a horizontal centering system is illustrated. The horizontal centering system includes a horizontal centering table 310 consisting of seven registers. Those registers are CRT B0, CRT B1, CRT B2, CRT B3, CRT B4, CRT B5 and CRT DEFAULT B. Each of the registers of the horizontal centering table is coupled to a MUX 320 or multiplexing circuitry 320. Also coupled to MUX 320 is a signal from select control such as select control 250 of FIG. 2. Once a graphics display mode or display mode is decoded from the value in CRT 12, a control signal from select control 250 may be sent to MUX 320 causing one of the entries of horizontal centering table 310 to be routed to horizontal centering control logic 330. It will be appreciated that an expansion to what is illustrated in FIG. 3 may be made such that a horizontal DDA expansion engine may also be incorporated with a corresponding value which would come from a table of DDA values. These values would also correspond to each of the graphics modes encoded by the values in lookup table 210 and these values would be routed through a multiplexer or similar circuitry to a horizontal DDA expansion engine.

Figure 4A:
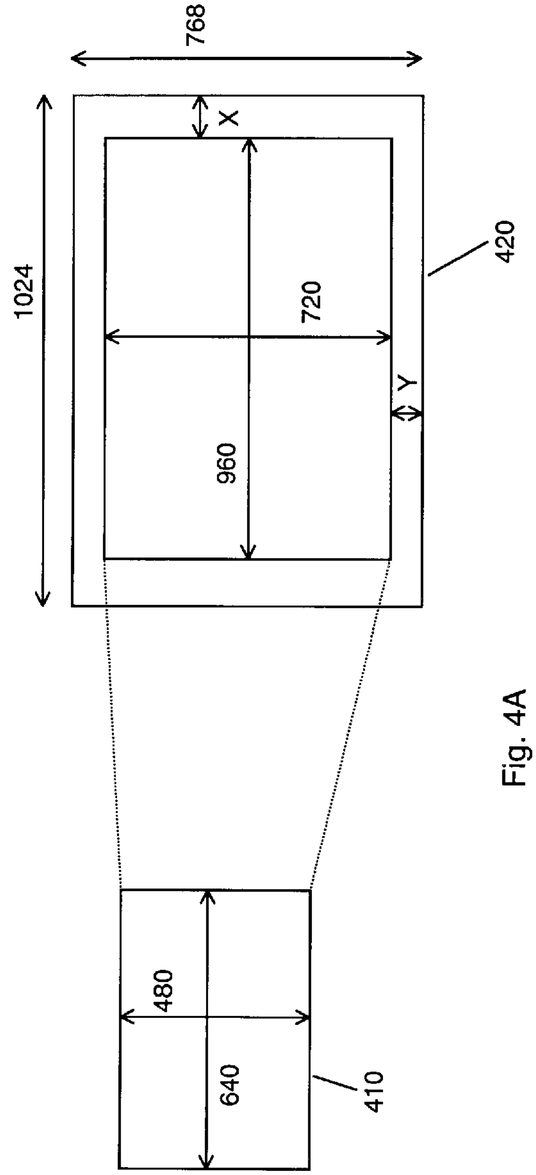
FIG. 4A illustrates the transformation which may occur when displaying an image intended for a resolution of 640×480 on a screen or a liquid crystal display screen with a resolution of 1024×768.

Turning to FIG. 4A, the expansion and centering of a 640×480 resolution image for display on a 1024×768 resolution LCD display is illustrated. Image 410 is expanded to fit on screen 420. The expanded size of the image is 960×720 pixels which represent an expansion of one and one-half times. This expansion is carried out by a DDA expansion engine. To center the image, the image is offset from either the top or the bottom of the screen for vertical centering. Here offset from the bottom of the screen is illustrated but it will be appreciated that offset from the top of the screen may be just as easily accomplished.

The value Y would be the value programmed into one of the registers in vertical centering table 230. Similarly a 10 bit DDA value would be programmed into one of the registers in DDA table 220 to cause the expansion to the 960×720 image illustrated on LCD 420. To properly center the image the value Y in this instance would be 6. This may be calculated as 6×4=24 and 24×2=48. 48 is the difference between the height of the image (720) and the height of the display (768) in pixels. The value of X which would be contained in horizontal centering table 310 in this example would be 8. This value would be calculated by 8>4=32 and 32×2=64. 64 is the difference between the width of the expanded image 960 and the width of the display 420 which is 1024 when measured in pixels. It will be appreciated that the values in the registers are the number of pixels divided by four as no shift of an odd number or a number otherwise not divisible by four is deemed necessary. Likewise it will be appreciated that such registers may be implemented such that any number may be encoded in the register and the register will not be multiplied by 4 or if it is deemed appropriate, the register may be multiplied by another scale factor such as 8, 2 or any other scale factor.

Figure 4B:
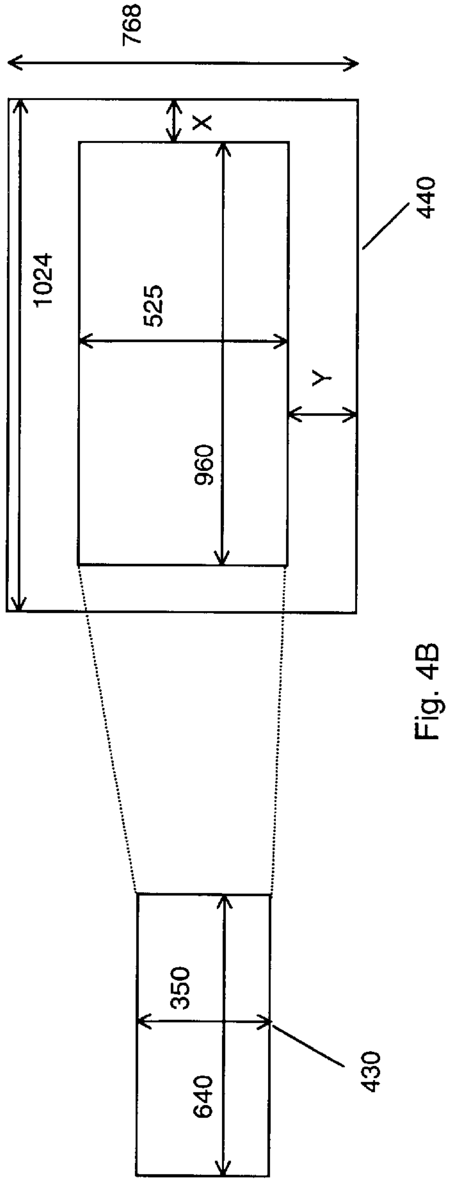
FIG. 4B illustrates the transformation that may occur when transforming an image intended for a 640×350 resolution for display on a liquid crystal display having a 1024×768 resolution.

Turning to FIG. 4B, enlargement and screen centering of the 640×350 image is illustrated. Again the image is enlarged by a factor of 1.5 to an image 960×525 in size measured in pixels. The image 430 is of size 640×350. It is to be displayed on liquid crystal display 440 which is of size 1024×768. As mentioned the image is expanded to a size 960×525. It will be appreciated that the difference between 525 and 768 is 243 pixels which is not a number neatly divisible by 4. Depending on the preferences of the programmer, the number 244 or the number 240 may be used for purposes of determining the offset. If the number 240 is used then the value of Y, the value actually encoded in the register for the vertical centering is 30 which results in an offset of 120. If this offset is from the top of the screen then the image will be found one or two pixels above where the image would be if it was exactly centered. If this offset is from the bottom of the screen likewise the image will be one or two pixels below where it would be if it were exactly centered. If the value 244 is used then it must be rounded up to 248. This results in a value of 31 encoded in the register. The value 30 was derived from the fact that centering the image means that the difference between the height of the image and the height of the screen must be divided by 2 resulting in a value of 120. That value is then divided by 4 resulting in a value of 30 and that is the value stored in the register. Likewise the value 31 is calculated by dividing the number 248 by 2 to center the image and then dividing the resulting number 124 by 4 to result in 31. It will be appreciated that the value for X is unchanged because the width of the image 430 is no different from the width 410.

Figure 4C:
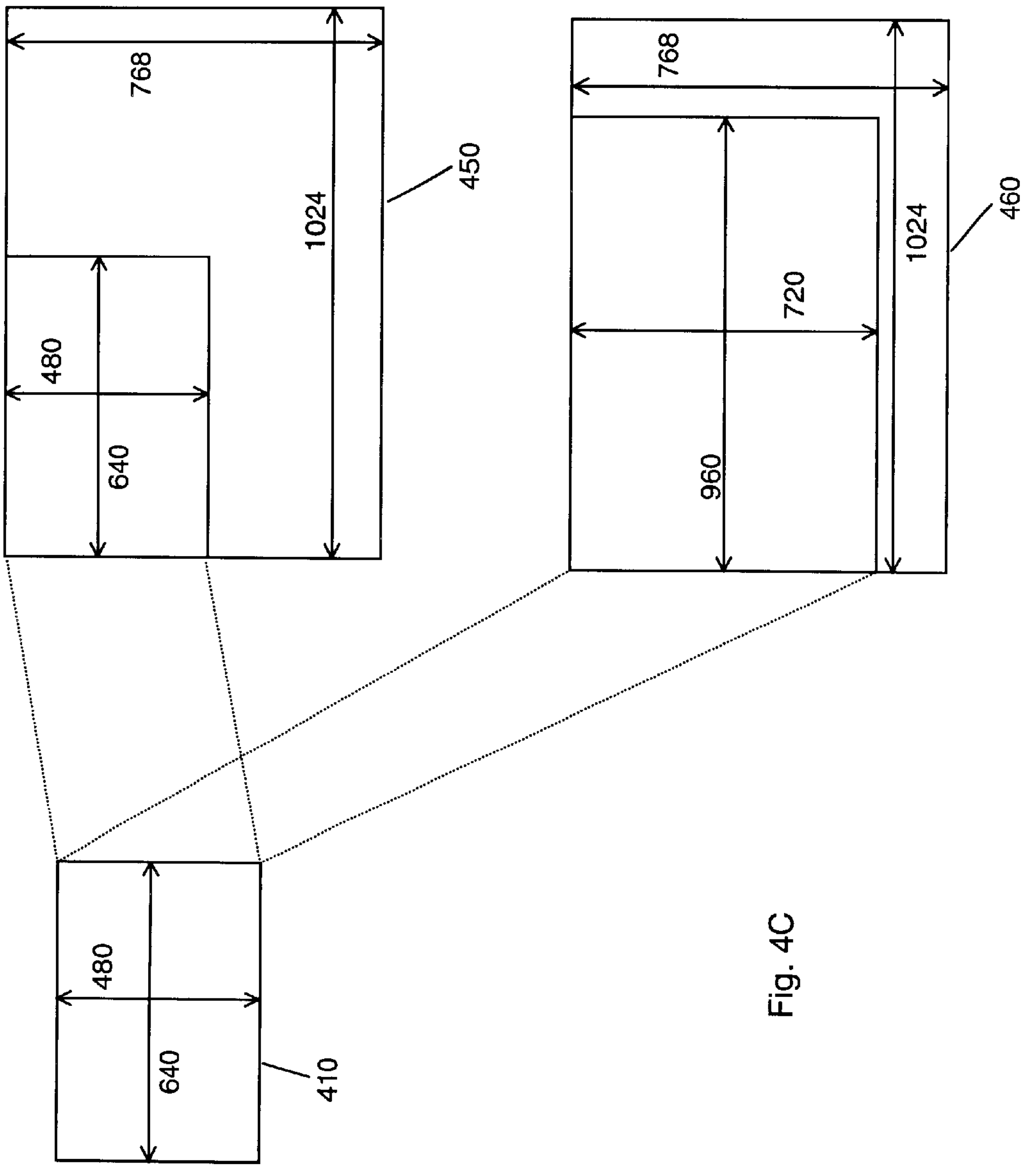
FIG. 4C illustrates two other transformations that may occur in displaying a 640×480 image on a liquid crystal display having a 1024×768 resolution.

Turning to FIG. 4C, two other illustrations of a display of a 640×480 image are illustrated. The 640×480 image, image 410, in one instance is displayed as a 640×480 image unexpanded in the upper left of hand corner of a 1024×768 pixel display 450. In the other instance it is illustrated as an expanded 960×720 image still displayed in the upper left hand corner of the 1024×768 pixel display 460. It will be appreciated that either display may be more awkward for the user as a large black space in the lower right portion including the lower portion and the right hand portion of the monitor will be evident. Furthermore if the image is not expanded then it may appear small on a liquid crystal display which is often smaller than the corresponding cathode ray tube display.

Figure 5:
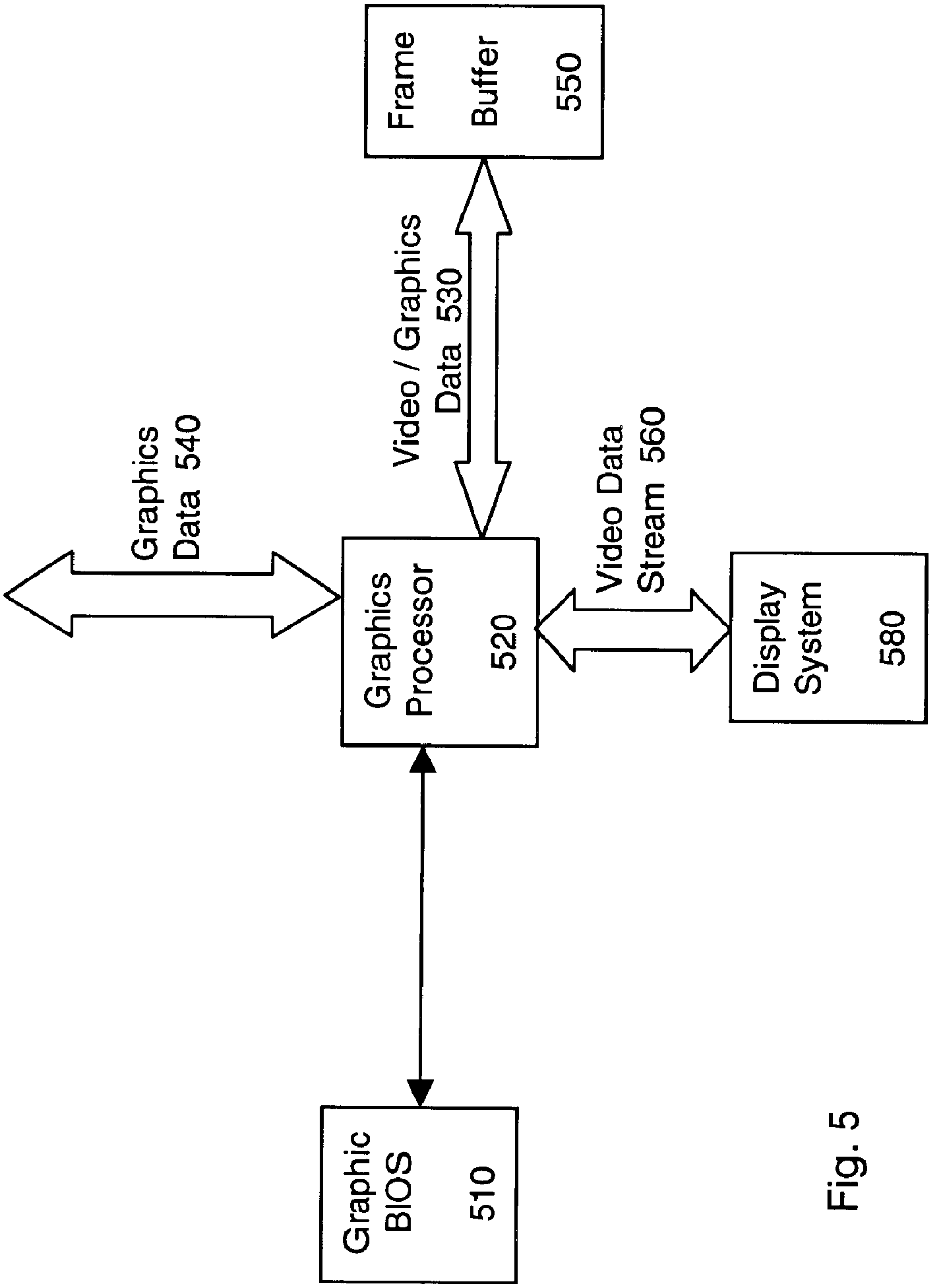
FIG. 5 illustrates one embodiment of a graphics subsystem which may incorporate the invention.

Turning to FIG. 5, a graphics subsystem which may incorporate the invention is illustrated. Graphics BIOS 510 is the built in operating system of the graphics subsystem. It contains routines which may be used by graphics processor 520 and it may also be designed to effectively run an operating system on graphics processor 520 such that this operating system may monitor the data flowing to graphics processor 520. Graphics processor 520 receives and sends out graphics data 540 and video and graphics data 530. Video and graphics data 530 is sent and received by frame buffer 550. Graphics processor 520 also sends video data stream 560 which typically goes to the display system 580, such as a liquid crystal display or cathode ray tube display. Graphics data 540, in one embodiment, is the graphics data supplied from an underlying computer system attached to the graphics subsystem. It is this data which is monitored by the operating system running on graphics processor 520 to determine what resolution or what display mode is being utilized. Video and graphics data 530 is, in some circumstances, the actual data sent to the display. That data is translated from graphics data 540 by graphics processor 520. As a result video and graphics data 530 may or may not resemble graphics data 540 even though it effectively encodes the same image. It will be appreciated that in one embodiment of the invention the components illustrated in FIGS. 2 and 3 are incorporated within graphics processor 520 as registers and other logic within the processor that are subject to the control of routines from graphics BIOS 510 running on graphics processor 520.

Figure 6:
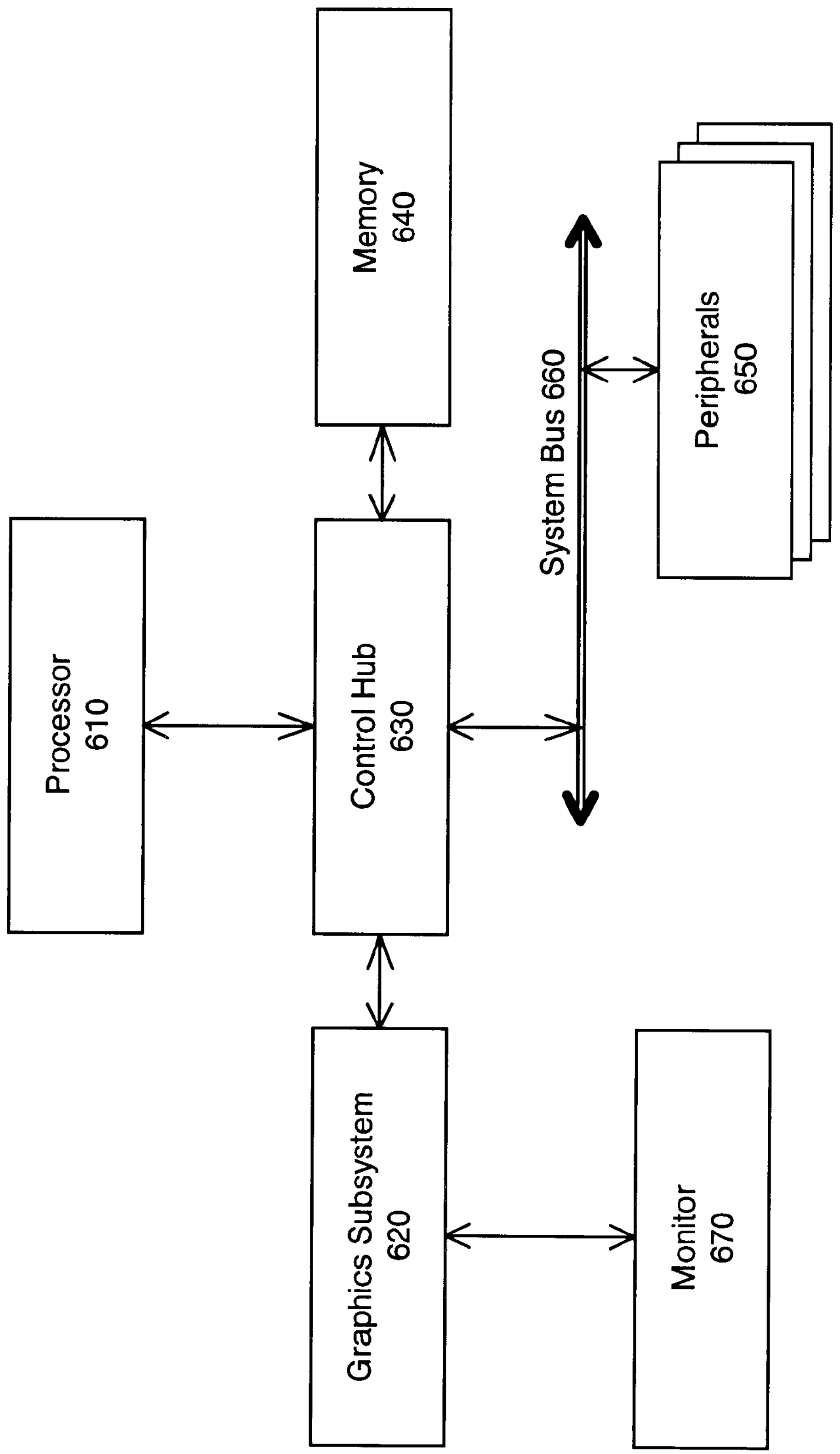
FIG. 6 illustrates one embodiment of a system which may incorporate the graphics subsystem which may incorporate the invention.

Turning to FIG. 6, a system utilizing the invention is illustrated. Processor 610 is coupled to control hub 630. Control hub 630 is also coupled to graphics subsystem 620, to memory 640 and to system bus 660. Control hub 630 may be an AGP or PCI controller for example. System bus 660 is coupled to peripherals 650. Graphics subsystem 620 is also coupled to monitor 670. Graphics subsystem 620 may receive instructions and data from control hub 630. It may also request data from memory 640 through control hub 630 and likewise request interrupts to processor 610 through control hub 630 and request information or data from peripherals 650 through control hub 630 and system bus 660. Processor 610 may control memory 640, system bus 660 and peripherals 650 in graphics subsystem 620 and monitor 670 through control hub 630. In one embodiment graphics subsystem 620 incorporates all of the components illustrated in FIG. 5 such as the graphics BIOS 510, graphics processor 520 and frame buffer 550. In that embodiment graphics data 540 is transmitted and received along the coupling between graphics subsystem 620 and control hub 630. Video data 560 is transmitted and received along the coupling between graphics subsystem 620 and monitor 670.

Figure 7:
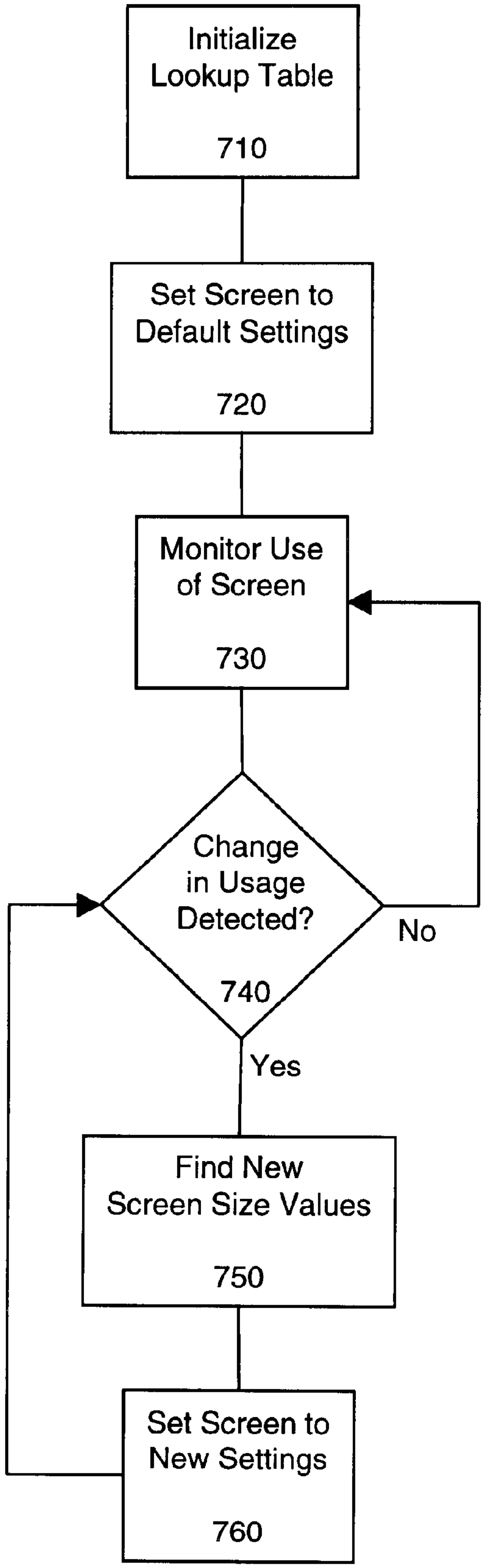
FIG. 7 illustrates one embodiment of a method of operating the invention.

Turning to FIG. 7, a method of operating an autoexpansion and autocentering system is illustrated. Initially a lookup table is initialized at initialize block 710. This lookup table may in one embodiment be the lookup table 210 illustrated in FIG. 2. Likewise the values of the other tables in FIG. 2 and FIG. 3 would be initialized at preferably about the same time. At block 720 the screen is set to default settings causing the screen to automatically display at whatever resolution is considered the default by the system. This may be set by either a BIOS such as BIOS 510 of FIG. 5 or an operating system of an attached computer system. At block 730 the use of the graphics system or the screen is monitored to determine what resolution of data is being sent to the graphics system. At block 740 an attempt to detect a change in such usage or a change in the display mode of the display device is made. If no change is detected the process flows to block 730. If a change is detected the process flows to block 750.

At block 750, a determination of the new resolution is made based on what the data indicates the new resolution or mode is or on instructions from the underlying computer system to switch to a new display mode. The value thus determined is written into the CRT 12 register in one embodiment. At block 760, the lookup table and compare logic determine whether any of the values in the lookup table match the new value in CRT 12. If a match is found, the corresponding DDA value and vertical centering values are routed to the DDA expansion engine and vertical centering logic. If no match is found, the default values are routed to the DDA expansion engine and vertical centering logic. The new values thus routed cause the screen to adjust to displaying the data in the new mode. The process then flows back to monitor block 730.

In the foregoing detailed description, the method and apparatus of the invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus comprising:

a lookup table having a set of entries, each entry capable of maintaining a value;

a DDA (Differential Digital Analyzer) table having a set of entries, each entry capable of maintaining a value, each entry of the DDA table corresponding to an entry of the lookup table;

a first multiplexing unit having a set of inputs, each input corresponding to and coupled to an entry of the DDA table, the first multiplexing unit having a control input, the control input causing the first multiplexing unit to route one of the inputs of the set of inputs to an output;

a comparison block having logic suitable for comparing each entry of the lookup table to a comparison value; and a select control block having logic suitable for generating a control signal based on an output of the comparison block, the output of the comparison block indicating which entry of the lookup table matched the comparison value, the control signal generated on an output of the select control block, the output of the select control block coupled to the control input of the first multiplexing unit.

2. The apparatus of claim 1 wherein the lookup table, the DDA table, the first multiplexing unit, the comparison block and the select control block are all embodied within a graphics processor.

3. The apparatus of claim 2 further comprising:

a vertical centering table embodied within the graphics processor having a set of entries, each entry capable of maintaining a value, each entry of the vertical centering table corresponding to an entry of the lookup table;

a second multiplexing unit embodied in a graphics processor having a set of inputs, each input corresponding to and coupled to an entry of the vertical centering table, the second multiplexing unit having a control input, the control input causing the second multiplexing unit to route one of the inputs of the set of inputs to an output; and the output of the select control block coupled to the control input of the second multiplexing unit.

4. The apparatus of claim 3 wherein:

the output of the first multiplexing unit coupled to an input of a DDA expansion engine of the graphics processor and the output of the second multiplexing unit coupled to an input of a vertical centering logic block.

5. The apparatus of claim 3 further comprising:

a horizontal centering table embodied within the graphics processor having a set of entries, each entry capable of maintaining a value, each entry of the horizontal centering table corresponding to an entry of the lookup table;

a third multiplexing unit embodied in a graphics processor having a set of inputs, each input corresponding to and coupled to an entry of the horizontal centering table, the third multiplexing unit having a control input, the control input causing the third multiplexing unit to route one of the inputs of the set of inputs to an output; and the output of the select control block coupled to the control input of the third multiplexing unit.

6. The apparatus of claim 5 wherein:

the output of the first multiplexing unit coupled to an input of a DDA expansion engine of the graphics processor, the output of the second multiplexing unit coupled to an input of a vertical centering logic block and the output of the third multiplexing unit coupled to an input of a horizontal centering logic block.

7. A system comprising:

a processor;

a control hub coupled to the processor;

a memory coupled to the control hub;

a graphics processor coupled to the control hub;

wherein the graphics processor includes:

a lookup table having a set of entries, each entry capable of maintaining a value;

a DDA (Differential Digital Analyzer) table having a set of entries, each entry capable of maintaining a value, each entry of the DDA table corresponding to an entry of the lookup table;

a first multiplexing unit having a set of inputs, each input corresponding to and coupled to an entry of the DDA table, the first multiplexing unit having a control input, the control input causing the first multiplexing unit to route one of the inputs of the set of inputs to an output;

a comparison block having logic suitable for comparing each entry of the lookup table to a comparison value; and a select control block having logic suitable for generating a control signal based on an output of the comparison block, the output of the comparison block indicating which entry of the lookup table matched the comparison value, the control signal generated on an output of the select control block, the output of the select control block coupled to the control input of the first multiplexing unit.

8. The system of claim 7 further comprising:

a monitor coupled to the graphics processor.

9. The system of claim 7 wherein:

the graphics processor further includes:

a vertical centering table having a set of entries, each entry capable of maintaining a value, each entry of the vertical centering table corresponding to an entry of the lookup table;

a second multiplexing unit having a set of inputs, each input corresponding to and coupled to an entry of the vertical centering table, the first multiplexing unit having a control input, the control input causing the first multiplexing unit to route one of the inputs of the set of inputs to an output; and the output of the select control block coupled to the control input of the second multiplexing unit.

10. The system of claim 9 wherein:

the output of the first multiplexing unit coupled to an input of a DDA expansion engine of the graphics processor, the output of the second multiplexing unit coupled to an input of a vertical centering logic block of the graphics processor and the output of the third multiplexing unit coupled to an input of a horizontal centering logic block of the graphics processor.

11. The system of claim 10 further comprising:

a liquid crystal display coupled to the graphics processor.

12. An apparatus comprising:

a first set of memory locations, each memory location capable of maintaining a value;

a second set of memory locations, each memory location capable of maintaining a value, each memory location of the second set of memory locations corresponding to a memory location of the first set of memory locations;

a first selector coupled to each memory location of the second set of memory locations, the first selector having a control input, the control input causing the first selector to route the value of one of the memory locations of the set of memory locations to an output;

a comparison block having logic suitable for comparing each memory location of the first set of memory locations to a comparison value; and a select control block having logic suitable for generating a control signal based on an output of the comparison block, the output of the comparison block indicating which memory location of the first set of memory locations matches the comparison value, the control signal generated as an output of the select control block, the output of the select control block coupled to the control input of the first selector.

13. An apparatus comprising:

a first set of memory locations, each memory location capable of maintaining a value;

a comparison block having logic suitable for comparing each memory location of the first set of memory locations to a comparison value;

a select control block having logic suitable for generating a control signal based on an output of the comparison block, the output of the comparison block indicating which memory location of the first set of memory locations matches the comparison value, the control signal generated as an output of the select control block, the output of the select control block coupled to a value provider; and the value provider coupled to receive the output of the select control block as a control input, the control input causing the value provider to produce a value at an output.

14. The apparatus of claim 13 further comprising:

a second set of memory locations, each memory location capable of maintaining a value, each memory location of the second set of memory locations corresponding to a memory location of the first set of memory locations;

and wherein:

the value provider is a selector, the selector coupled to each memory location of the second set of memory locations, the control input causing the first selector to route the value of one of the memory locations of the set of memory locations to an output.

15. The apparatus of claim 14 wherein the first set of memory locations comprising a lookup table, the second set of memory locations comprising a DDA table; and the lookup table, the DDA table, the selector, the comparison block and the select control block are all embodied within a display controller.

16. An apparatus comprising:

a first set of memory locations, each memory location capable of maintaining a value;

a second set of memory locations, each memory location capable of maintaining a value, each memory location of the second set of memory locations corresponding to a memory location of the first set of memory locations;

a first selector coupled to each memory location of the second set of memory locations, the first selector having a control input, the control input causing the first selector to route the value of one of the memory locations of the set of memory locations to an output;

a comparison block having logic suitable for comparing each memory location of the first set of memory locations to a comparison value; and a select control block having logic suitable for generating a control signal based on an output of the comparison block, the output of the comparison block indicating which memory location of the first set of memory locations matches the comparison value, the control signal generated as an output of the select control block, the output of the select control block coupled to the control input of the first selector.

* * * * *